Patented July 14, 1936

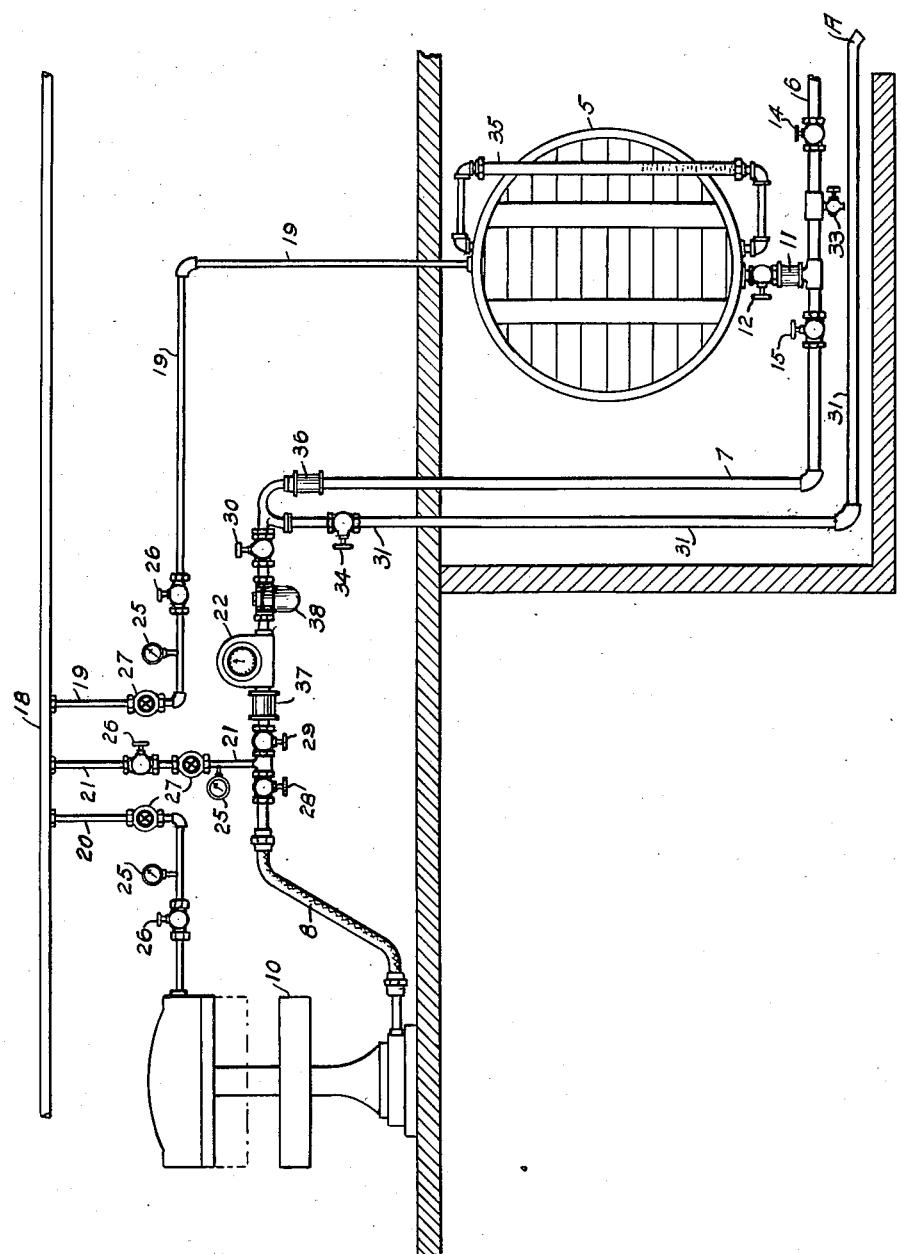

2,047,927

UNITED STATES PATENT OFFICE 2,047,927

METHOD AND APPARATUS FOR SAVING BEER

Norman S. Goldberger, Long Branch, N. J., and Joseph D. Weiss, New York, and Louis Gress, New Rochelle, N. Y.; said Weiss and Gress assignors to said Goldberger; Adele D. Goldberger, Frank J. Deitsch, and Herbert C. Kottek, administrators of said Goldberger, deceased Application July 20, 1935, Serial No. 32,398

16 Claims. (Cl. 137—78)

This invention relates to systems including beer lines for conveying beer from Government gaged tanks in breweries through the Government meter to the bottling or filling devices, and relates more particularly to methods and means for preventing the spoilage of beer from being left over night in the beer line.

In breweries provision is made to insure that the brewery shall pay the revenue due to the Government. To this end there are provided Government gaged tanks into which are received from the brewery all beer before it passes to bottling or filling machines or devices. The only connection between the Government gaged tank and the filling device is through the beer line, or pipe, in which is interposed the Government meter for measuring all beer delivered to the filling devices.

These tanks are so constructed or lined that beer left in them is not injured; but the beer lines are of considerable length, and beer which remains in the line over night has a tendency to become flat. Heretofore it has been the custom to discard this beer, but this is very expensive, principally because of the cost of the revenue tax and partly because of the cost of the beer that has to be paid thereon. An object of the present invention is to provide a method and means for avoiding this loss of the beer.

To this end a further object of the invention is to provide a method and means for emptying the beer line without wastage of beer or loss of revenue.

Another object is to prevent similar waste of the beer in the bottling machine.

Another object of the invention is to provide a method and means for cleansing and sterilizing the beer line and machine after they have been thus emptied.

Still other objects of the invention will appear as the description proceeds; and while herein details of the invention are described in the specification and some of the claims, the invention is not limited to these, since many and various changes may be made without departing from the scope of the invention as claimed in the broader claims.

The inventive features for the accomplishment of these and other objects are shown herein in connection with a beer conveying and pressure return system which briefly stated, includes a beer line passing from the brewery and near the lower part of the Government gaged tank to the bottling or filling machine. The Government meter is in the beer line between the machine and tank and is adapted to meter liquid passing forwardly therethrough and will allow the passage of air or gas in either direction and the passage of beer and air or gas backwardly without metering. A tank valve connecting said line and the tank allows the tank to be cut off from the line.

Carbon dioxide is liberated by the beer fermentation in the brewery and is supplied under high pressure to a carbon dioxide line from which it is supplied to a tank pressure pipe, a machine pressure pipe and a beer line pressure pipe respectively connecting said pressure line with the upper part of the Government tank, the filling machine, and the beer line near the outlet of the meter.

A valve and an adjustable pressure reducer in each pressure pipe allows the carbon dioxide to be introduced into the line or the bottling machine at a higher pressure than the pressure in the tank, thereby forcing the beer out into bottles and back into the tank whereupon the tank valve may be closed. It is understood that compressed air or other gas may be used instead of the carbon dioxide.

A valved wash out pipe is connected to the beer line near the inlet side of the meter for the introduction of cleansing steam and hot water into the thus emptied beer line, to be discharged through an outlet valve in the line between the tank valve and the inlet end of the beer line.

In the accompanying drawing showing, by way of example, one of many possible embodiments of the invention; the figure is a diagrammatic side elevation showing the system.

The improved waste preventing beer pressure and return system is shown in combination with a Government metered tank 5 and a beer line 6, 7, 8 passing from the brewery (not shown) past the lower part of said tank to the lower part of the bottling machine 10 or other filling device, the part 8 of the line adjacent to the machine being a hose which may be disconnected from the bottling machine 10. A connection is provided between said line and the bottom of the tank having therein a sight glass 11 and tank valve 12; and there is an inlet valve 14 in the beer line at the inlet side of said connection and a cut off valve 15 in the line at the other side of said connection, whereby beer may be directed from the brewery into the tank or from the tank to the filling machine.

A fluid pressure line 18 has therein carbon dioxide at about 40 pounds pressure per square inch, received from a storage tank, through a suitable compressor from the fermentation tanks in the brewery, not shown, but understood. A tank pressure pipe 19, a bottle filling machine pressure pipe 20 and a beer line pressure pipe 21 are shown respectively connecting said pressure line with the upper part of the tank 5 and the filling machine 10. A beer line 7, is connected to the Government beer meter 22 between the machine 10 and tank 5 and is adapted to pass liquid and gas forwardly or backwardly to meter the liquid when moving toward the filling machine.

Opening the inlet and tank valves 14, 12 and closure of the valve 15, allows the beer to be forced into the Government tank 5; while closing the inlet valve 14 and opening the other two valves 12, 15 allows the beer to pass from the tank through the meter to the bottling machine under a pressure of about 20 lbs., as controlled by reducing valve 27, from pipe 19.

A pressure gage 25, a hand valve 26 and an adjustable pressure reducer 27 are provided in each pressure pipe; there are also hand valves 28, 29 in the beer line at opposite sides of the pressure pipe 21 and a valve 30 between the meter and wash out pipe 31 later to be described.

The pipe 19 furnishes carbon dioxide under a pressure of about 20 lbs. to the upper part of the Government tank 5, for forcing beer therefrom to the bottling machine; the pipe 20 furnishes said gas under pressure of about 5 lbs. above that of tank 5, under the control of its reducing valve 27, to the filling head of the bottling machine for purposes to be hereinafter described more in detail.

The tank 5 may be of wood, or of suitably lined steel, or otherwise constructed to prevent injury to beer held therein. To reclaim the beer left in the beer line at the close of the day, it is forced out of the beer line by means of carbon dioxide from the pressure line, as will now be explained.

By means of the pressure reducer 27 in the pipe 21, the pressure therein is raised a few pounds above the pressure in the head of the bottle filling machine 10. Then, by opening the valve 26 in the pipe 21, while maintaining the valve 28 open and the valve 29 closed, the gas pressure from the pipe 21 forces all of the metered beer from the line 8, in front of the meter 22, into bottles in the usual manner, after which the bottles are capped.

Then the valve 28 is closed, and the valve 29 is opened, while maintaining valves 30, 15 and 12 open and valves 14, 33 and 34 closed, and the pressure in pipe 21 forces the beer back through the beer line and into the tank 5, whereupon the valve 12 is closed.

Alternatively, if preferred, the beer line may be emptied by raising the pressure in the bottling machine pressure pipe 20, five or more pounds over the pressure in the tank 5, and then opening the tank valve 12 and the beer line valves 15, 30, 28 and 29, keeping valves 14, and valves 33, 34 closed, and then opening the valve 26 of the pipe 20, while maintaining the other two pressure reducing valves closed, thereby forcing the beer backwardly and downwardly in the bottling machine, back through the meter and beer line into the tank 5 emptying said bottling machine, meter and beer lines, whereupon closure of the tank valve 12 holds the beer in the tank. Thus no beer remains in either the bottling machine or the meter and beer lines, so that loss of beer through wastage, or spoilage, and loss of revenue through the wastage of tax metered beer is obviated.

After the beer line and bottling machine have been emptied by any of the methods above described, the beer line and machine may be washed out and sterilized by means now to be described.

The beer line is provided with a pet cock or beer discharge outlet valve 33 inserted in the side of the beer line between the inlet valve 14 and said connection and the sight glass 11; and a wash out pipe 31, which is connected to the beer line near the inlet side of the meter has a closure valve 34 therein near the beer line for the introduction of cleansing hot water, and afterwards, sterilizing steam into the beer line, to be discharged through the outlet valve 33.

The hot water and steam line not shown, is connected to the inlet end A of pipe 31, and these fluids are caused to pass through the beer line when valve 34 is opened and valve 30 is closed.

If desired some of the hot water and steam may be conducted through the hose 8 and through the filling machine 10. However, the hose is removable, being forward of the meter, so that the hose and machine may be disconnected and separately cleaned.

The drawing also shows a liquid level gage 35 communicating with the upper and lower parts of the tank, and sight glasses 11, 36, 37, in the beer line and a filter 38 at the inlet of the meter.

From the foregoing it will be seen that an effectual saving is accomplished, both in beer and taxes by the present method of beer return. In many breweries, the Government tanks are located, under Government seal, several hundred feet away from the bottling or filling departments, thus the volume of beer in the beer lines between the tank and filling department is considerable. The beer in the pipe line, if left over night, becomes contaminated, and therefore, its flavor and aroma is affected injuriously, and thus it is discharged to the sewer, as it cannot be used.

In other instances of use, it may be desired to change a bottle filling machine over from a light to a dark beer, by switching from one Government tank to another. By proper manipulation of the various valves the pipe contained beer, metered, may be passed into bottles, and the unmetered beer passed back to the Government tank, the switch to the other tank effected, without any loss of beer whatever.

In addition to the mode of cleaning the beer line as hereinbefore noted, this system also permits of the use of the pipe line cleaning methods in practice today by the use of a bristle ball which may be driven ahead of the hot water, the ball being introduced into and recaptured from the beer line, after scouring, by known means.

We claim as our invention:

1. In combination a pressure tank; a filling device; a beer line from said tank to the device; a meter in said line between the device and tank and adapted to meter liquid moving toward the device; a valved gas pressure pipe connecting with the beer line near the outlet of the meter; a pressure control means in said pipe; and a valve in the beer line between the meter and the pressure pipe.

2. In combination a tank; a filling machine; a beer line passing from the lower part of said tank to the machine; a meter in said line between the machine and tank and adapted to meter liquid moving toward the machine; means applying gas pressure in the upper part of the tank; a pressure pipe connected to the beer line near the outlet of the meter for applying greater pressure to the beer line than in the tank; and valves in the beer line at opposite sides of the beer line pressure pipe.

3. In combination a tank; a filling machine; a beer line passing below said tank to the lower part of the machine; a meter in said line between the machine and tank and adapted to meter liquid; a tank valve connecting said line and tank; an inlet valve in the inlet end of the beer line; a cut-off valve in the beer line near said tank valve between the tank valve and meter; a pressure line; a tank pressure pipe, a machine pressure pipe and a beer line pressure pipe respectively connecting said pressure line with the upper part of the tank and the machine, and the beer line near the outlet of the meter; a valve and an adjustable pressure reducer in each pressure pipe; and valves in the beer line at opposite sides of the beer line pressure pipe.

4. In combination a pressure tank; a filling machine; a beer line passing near the lower part of said tank to the machine; a tank valve between said line and the tank; an inlet valve in the inlet end of the beer line; a pressure pipe for filling the beer line with gas and forcing the beer back into the tank; an outlet valve connected to the side of the beer line between the inlet and tank valves; a wash out pipe connected to an intermediate part of the beer line; and a valve in the wash out pipe near the beer line for the introduction of cleansing steam and hot water from the wash out pipe into the beer line, to be discharged through the machine and through said outlet valve.

5. In combination a pressure tank; a filling machine; a beer line passing near the lower part of said tank to the machine; a meter in said line between the machine and tank and adapted to meter liquid; a tank valve between said line and the tank; an inlet valve in the inlet end of the beer line; a cut-off valve in the beer line near said tank valve; a machine pressure pipe and a beer line pressure pipe respectively connecting said pressure line with the upper part of the machine, and the beer line near the outlet of the meter; a valve and an adjustable pressure reducer in each pressure pipe; valves in the beer line at opposite sides of the beer line pressure pipe; an outlet valve connected to the side of the beer line between the inlet and tank valves; a wash out pipe connected to the beer line near the inlet side of the meter; a cut-off valve between the meter and wash out pipe; and a valve in the wash out pipe near the beer line for the introduction of cleansing steam and hot water from the washout pipe into the beer line, to be discharged through the machine and through the outlet valve.

6. A method of removing beer from a beer line extending from a pressure tank having a meter to a filling device, said method comprising forcing gas under pressure greater than the tank pressure into an intermediate part of the beer line for forcing the beer from said part out through the filling device and forcing the beer from said part back through the meter and into the tank.

7. A method of removing beer from a beer line extending from a tank to a filling device having a meter in said line between the device and tank and adapted to pass gas and to meter liquid moving toward the device, said method comprising forcing carbon dioxide gas under pressure into the beer line at a point of the beer line near the outlet of the meter, thereby forcing the beer from said point out through the filling device, and then forcing said gas into the line and thereby forcing the beer from said point back through the meter and into the tank, thereby replacing beer in the line with the gas; and then holding the beer in the tank and washing and sterilizing the line.

8. A method of removing liquid from a liquid line from a pressure tank having a meter to a filling device, said method comprising forcing gas under pressure greater than the tank pressure at an intermediate point of the liquid line for forcing the liquid from said point out through the filling device and forcing the liquid from said point back through the meter and into the tank.

9. A method of removing liquid from a liquid line from a tank to a filling device having a meter in said line between the device and tank and adapted to pass gas and to meter liquid moving toward the device, said method comprising forcing carbon dioxide gas under pressure at a point of the liquid line near the outlet of the meter, thereby forcing the liquid from said point out through the filling device, and then using said gas for forcing the liquid from said point back through the meter and into the tank, thereby replacing liquid in the line with the gas; and then holding the liquid in the tank and washing and sterilizing the liquid line.

10. An apparatus comprising in combination a pressure tank; a filling device; a beer line having a portion passing through the bottom of said tank so as to lead to the device; controlled means for supplying gas under pressure to the upper part of the beer line for forcing beer back into the tank; a closure valve in said portion below the bottom, an outlet valve connected to the beer line separate from the filling device and a wash out pipe connected to the beer line.

11. An apparatus as in claim 10 in which the outlet valve is near the tank and the washout pipe is connected to the beer line between the device and tank remote from the tank.

12. In combination a pressure tank; a filling device above the level of the tank; a beer line passing from the bottom of said tank to the device; an inlet valve in the inlet end of the beer line near the tank; an outlet valve connected to the beer line below the tank near the inlet end; and a valved wash out pipe connected to the beer line remote from the tank for the introduction of cleaning medium into the beer line to be discharged through said outlet valve.

13. In combination a pressure tank; a filling device; a beer line passing from the bottom of said tank to the device; a meter in the beer line; controlled means for supplying gas under pressure to the upper part of the beer line for forcing beer back into the tank; and a wash out pipe and an outlet valve connected to the beer line between the tank and meter.

14. In combination a pressure tank; a filling device; a beer line passing near the lower part of said tank to the device; a tank valve connecting said line and tank; a wash out pipe connected to the beer line remote from the tank and between the device and tank; and an outlet valve connected to the beer line; the tank valve being between said device and the outlet valve.

15. In combination a pressure tank; a filling device; a beer line passing near the lower part of said tank to the device; a tank valve connecting said line and the lower part of the tank; a meter in said line between the device and tank; an outlet valve connected to the beer line near the tank; and a valved wash out pipe connected to the beer line near the inlet side of the meter for the introduction of cleaning medium into the beer line to be discharged through the outlet valve.

16. In combination a pressure tank; a filling device above the level of the tank; a beer line passing below the lower part of said tank to the device; a tank valve connecting said line and the bottom of the tank at a point between the inlet valve and the device; an outlet valve connected to the side of the beer line below the tank valve; and a wash out pipe connected to the beer line remote from the tank for the introduction of cleaning medium into the beer line to be discharged through the outlet valve.

NORMAN S. GOLDBERGER.
JOSEPH D. WEISS.
LOUIS GRESS.

CERTIFICATE OF CORRECTION.

Patent No. 2,047,927.　　　　　　　　　　　　　　　　　　July 14, 1936.

NORMAN S. GOLDBERGER, ET AL.

It is hereby certified that error appears in the above numbered patent requiring correction as follows: In the grant, lines 5 and 16, and in the heading to the printed specification, line 9, for the word "Administrators" read Executors and Trustees; and that the said Letters Patent should be read with these corrections therein that the same may conform to the record of the case in the Patent Office.

Signed and sealed this 8th day of September, A. D. 1936.

Leslie Frazer (Seal)　　　　　　　　　　　　　　　　　　Acting Commissioner of Patents.